United States Patent
Wu et al.

(10) Patent No.: US 7,330,413 B2
(45) Date of Patent: Feb. 12, 2008

(54) SMART BURN METHOD FOR OPTICAL DRIVE

(75) Inventors: Jan-Tang Wu, Taipei (TW); Chen-Yu Wang, Taipei (TW)

(73) Assignee: ALi Corporation, Taipei (TW)

( * ) Notice: Subject to any disclaimer, the term of this patent is extended or adjusted under 35 U.S.C. 154(b) by 562 days.

(21) Appl. No.: 10/902,851

(22) Filed: Aug. 2, 2004

(65) Prior Publication Data

US 2005/0232099 A1    Oct. 20, 2005

(30) Foreign Application Priority Data

Apr. 20, 2004    (TW) ................... 93110905

(51) Int. Cl.
*G11B 7/00* (2006.01)
(52) U.S. Cl. .................. 369/53.31; 369/44.34
(58) Field of Classification Search ............. 369/53.32, 369/44.34
See application file for complete search history.

(56) References Cited

U.S. PATENT DOCUMENTS

| | | | | |
|---|---|---|---|---|
| 5,257,248 A | * | 10/1993 | Ogasawara | 369/53.35 |
| 5,896,351 A | * | 4/1999 | Misaizu et al. | 369/30.11 |
| 6,504,802 B1 | * | 1/2003 | Tsukahara et al. | 369/53.28 |
| 7,012,867 B2 | * | 3/2006 | Kurobe et al. | 369/47.48 |
| 7,031,242 B2 | * | 4/2006 | Masaki et al. | 369/53.28 |
| 7,151,732 B2 | * | 12/2006 | Tsuji | 369/53.31 |
| 2001/0017973 A1 | * | 8/2001 | Abe | 386/52 |
| 2001/0030918 A1 | * | 10/2001 | Tabuchi et al. | 369/53.37 |
| 2002/0039335 A1 | | 4/2002 | Masaki et al. | 369/53.14 |
| 2002/0172106 A1 | * | 11/2002 | Kim et al. | 369/53.37 |
| 2002/0191506 A1 | * | 12/2002 | Okamoto et al. | 369/47.4 |
| 2004/0225710 A1 | * | 11/2004 | Murai et al. | 709/200 |

* cited by examiner

Primary Examiner—Thang V. Tran
(74) Attorney, Agent, or Firm—Troxell Law Office, PLLC

(57) ABSTRACT

The present invention is smart burn method for optical drives. When the laser pick-up head bears great oscillations along the vertical and horizontal directions, the laser light cannot focus on the track accurately that causes the failure of writing. The present invention proposes a re-link method employing a technique of controlling focus error signal, tracking error signal, or both, and capable of automatically reducing the writing speed of an optical drive while detecting an occurrence of a preset burn-error parameter is being exceeded, such that a stable and good writing quality can be achieved.

24 Claims, 6 Drawing Sheets

SMART BURN METHOD FOR OPTICAL DRIVE

FIELD OF THE INVENTION

The present invention relates to a smart burn method for optical drives, and more particularly, to a re-link method employing a technique of controlling focus error signal, tracking error signal, or both, and capable of automatically reducing the writing speed of an optical drive while detecting an occurrence of a preset burn-error parameter is being exceeded, such that a stable and good writing quality can be achieved.

BACKGROUND OF THE INVENTION

As electronic products, particularly computer peripheral, are developing in a fast path, and the present computer data is very large, general storage media except hard disks no longer fulfill the requirements. The present computer users usually back up computer data by using DVD or VCD burners, and the capacity of each optical disk (VCD format or DVD format) ranges from 700 MB to 4.7 GB in order to comply with the requirements of storing large quantity of computer data.

When purchasing a burner on the market, not only the writing speed has to be considered, the program utilized by the burner is also extremely important. While it is always desired to operate at its maximal and optimal writing speed, the stability and quality of writing cannot be ignored. Therefore, how to simultaneously optimize both the speed and quality of writing becomes the most urgent issue in the field.

The U.S. Pat. No. 0,166,025 discloses a conventional method of continuous burn for storage medium, wherein the burner will stop the writing process when buffer under run occurs and check if there is any data resided in the data buffer. The burner will restart the process after the data stored in the data buffer exceeds a preset value. This is one of the conventional techniques for solving the issue of buffer under run.

On the other hand, the U.S. Pat. No. 0,067,854 discloses another conventional smart burn technique, wherein by monitoring the writing speed of the burner and the transmission speed from the host computer to the data buffer in real time, the writing speed is controlled to be always larger than the transmission speed to reduce the occurrence frequency of buffer under run.

Differ from the above-mentioned conventional techniques, the present invention provides another smart burn method capable of reducing the possibility of write failure to the least.

SUMMARY OF THE INVENTION

In view of the disadvantages in the prior art, the present invention provides a smart burn method for optical drive. Conventionally, as the laser pick-up head bears great oscillations along the vertical and horizontal directions, the laser light cannot be focused on the tracks accurately causing the failure of writing. The present invention proposes a smart burn method employing a technique of controlling focus error signal, tracking error signal, or both, and capable of automatically reducing the writing speed of an optical drive while detecting an occurrence of a preset burn-error parameter is being exceeded, such that a stable and good writing quality can be achieved.

Another object of the present invention is to solve the problem of the instabilities in the writing process due to the uneven production qualities of the disks on the market. If the quality is not examined in the beginning stage of the writing process, automatic speed reduction will be executed and more time will be consumed in the writing process. To improve the above-mentioned disadvantages, the procedure of the present invention detects the optimal writing speed in the beginning stage that eliminates the auto speed reduction process and hence shortens the writing time.

With the following drawings and detailed descriptions, the objects, features, and advantages of the present invention are described in detail

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

If the optical pick-up head bears great oscillations along the vertical and horizontal directions during the disk writing process, the laser light cannot be focused on the tracks accurately that causes the failure of writing. To overcome the failure in writing, the optical pick-up head has to maintain stable at all time. Since both the optical pick-up head and the disk have uncertainty in their stabilities, mechanisms that monitor and control the focus error signal (FE) or the tracking error signal (TE) during the writing process are very important. Whenever the FE or TE signal exceeds a certain threshold, the speed reduction mechanism will be executed to ensure a successful writing process. In such case, the revolution rate will be slowed down and the excessive waver of the optical pick-up head can be avoided during track seeking.

Figure 1:
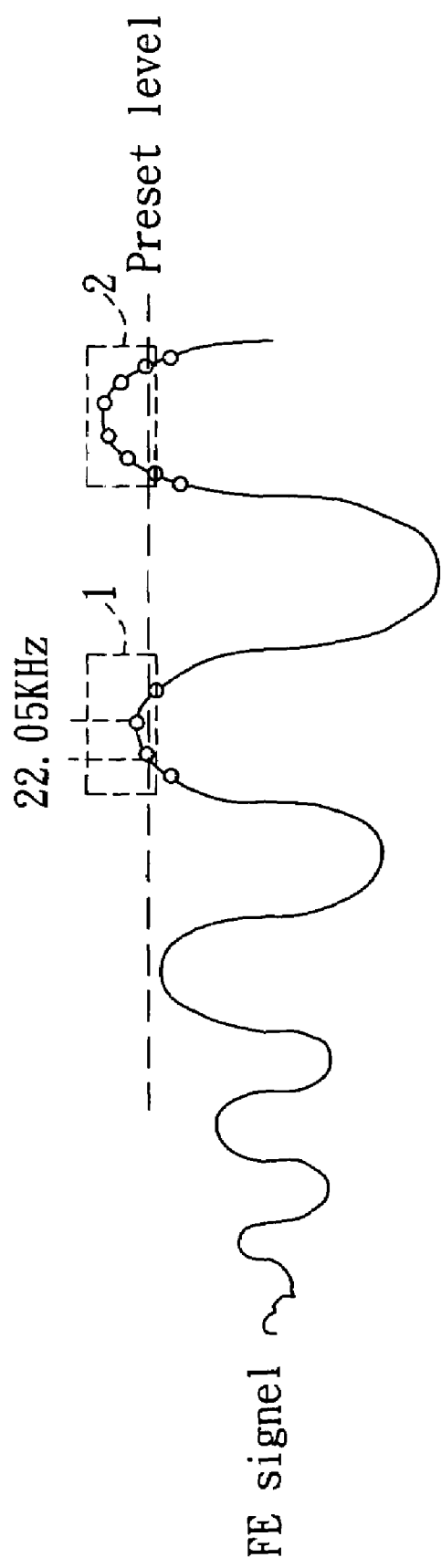
FIG. 1 is an observation of the focus error signal of the present invention.
Figure 2:
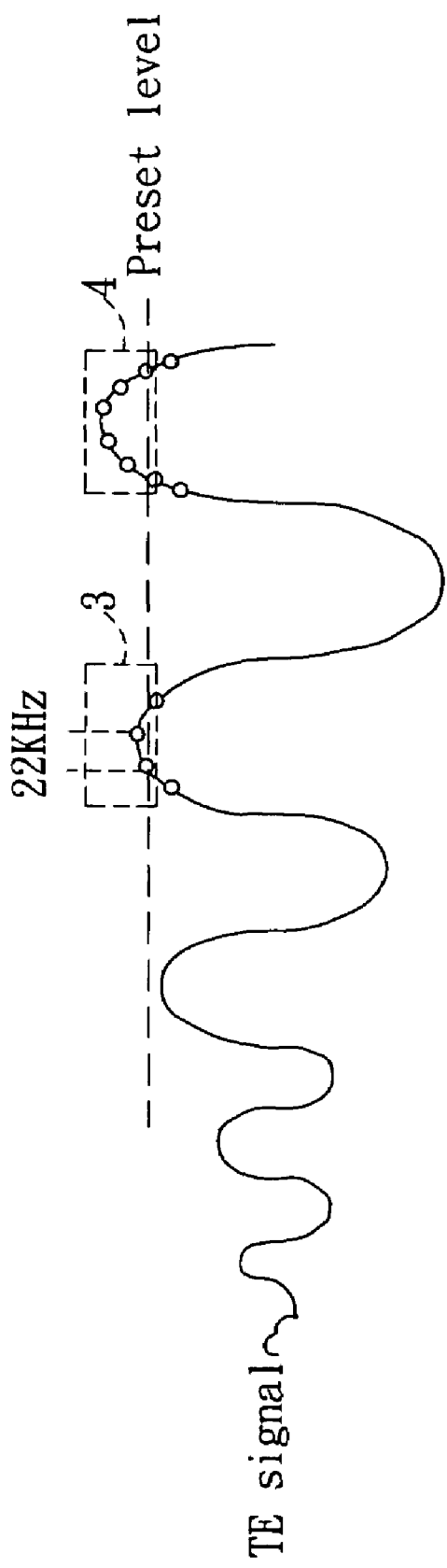
FIG. 2 is an observation of the tracking error signal of the present invention.

Please refer to FIG. 1 and FIG. 2. When the optical drive is operated in a very high speed that the FE or TE signal has exceeded the limit that makes successful writing impossible as disclosed above, a digital signal processor (DSP) can be utilized to sample and compare the FE or the TE signal. If the number of the consecutive sampled points of the FE or the TE signal exceeding the threshold is beyond a system preset value (which can be defined by designers), the writing process will be interrupted since the feeding signal is poor and the optical pick-up head is in an unstable condition. This mechanism is so called the "signal width and height" monitoring. As implied by the name, the signal has a certain width and height for the optical pick-up head to deviate from the center for a period of time while the signal is being monitored continuously. The writing process will be resumed after the writing speed is reduced to a lower rate. For instance: set the preset parameter of a bad disk as that when more than four points of the peak of the FE or the TE signal are being sampled. Moreover, a frequency comparison mechanism and an accumulation mechanism are being utilized as the monitoring device. As indicated by the first observation point 1 shown in FIG. 1 and the third observation point 3 shown in FIG. 2, a safe writing standard is determined since less than 4 points that exceed the threshold are being sampled in a single peak. The number of the accumulated points will be cleared, and the detection of the next signal peak will be proceeded. As indicated by the second observation point 2 shown in FIG. 1 and the fourth observation point 4 shown in FIG. 2, more than 4 points (6 points) that exceed the threshold are being sampled in the same peak. A poor writing condition is determined since it exceeds the preset value. Therefore, the writing process will be resumed after the writing speed is reduced. This is the first embodiment of the present invention.

Figure 3:
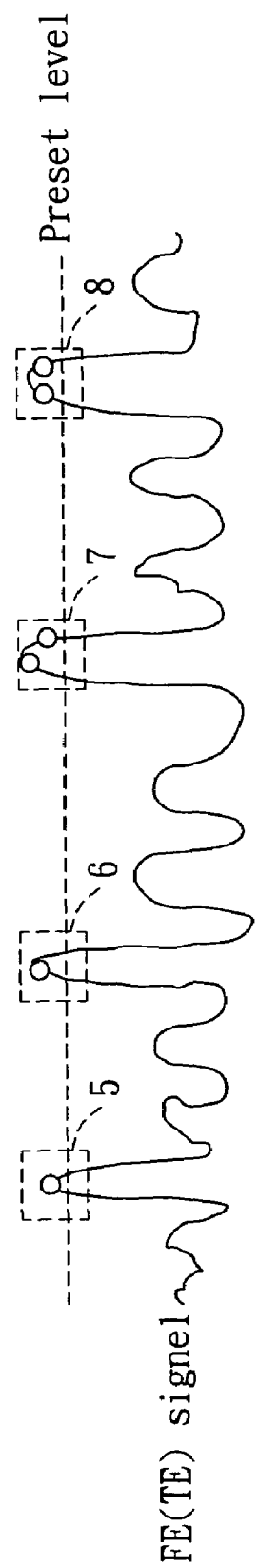
FIG. 3 is an observation of the noise of the focus error signal or the tracking error signal of the present invention with intense and sharp peaks.

Please refer to FIG. 3. The qualities of the disks on the market vary since different manufacturing procedures are being used. As a consequence, the stabilities in the writing process vary as well. The disks with poorer qualities generate sharp and intense noise in the writing process, which is called the "peak" (as indicated by the fifth 5, the sixth 6, the seventh 7, and the eighth 8 observation points). This signal disturbs the optical pick-up head significantly, causing write failure, unable to read, and other problems. Therefore, the writing process has to be stopped when the above-mentioned situation is detected. Since the sampling points in the first preferred embodiment of the present invention is not sufficient to determine the criteria to stop the writing process, the threshold in the second preferred embodiment of the present invention is therefore set to be higher than the first preferred embodiment. The quality of the disk is determined to be poor if the accumulated number of the consecutive sampled points that exceed-the threshold is beyond the predefined value. The speed will be reduced to obtain a more stable writing quality. This is the second preferred embodiment of the present invention.

Figure 4:
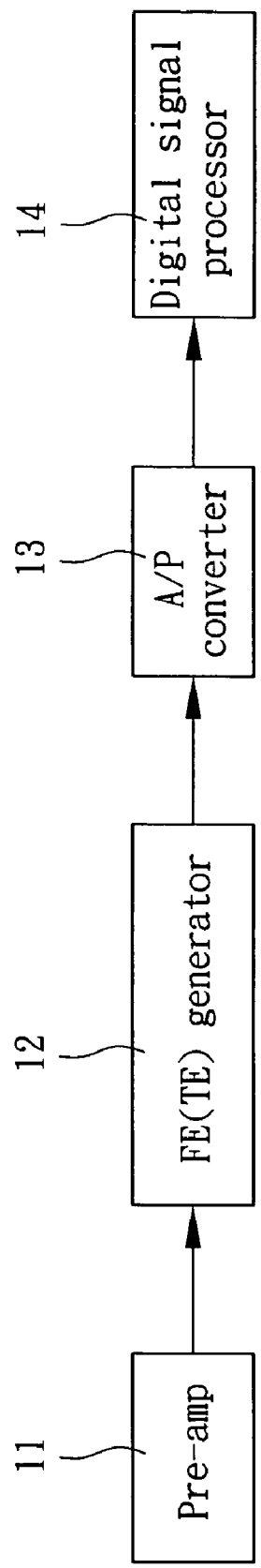
FIG. 4 is a diagram showing a structure for detecting the focus error signal or the tracking error signal of the present invention.

Please refer to FIG. 4, which is is a diagram showing a structure for detecting the focus error signal or the tracking error signal of the present invention. Wherein, the structure includes:

a preamplifier 11, for amplifying the writing signal a FE(TE) signal generator 12, for generating FE or TE signal an analog/digital converter 13, for converting an analog signal into a digital signal a digital signal processor 14, capable of monitoring the FE or the TE signal and comparing it with a preset value, which is also capable of sending a interrupt flag to the burner.

Figure 5:
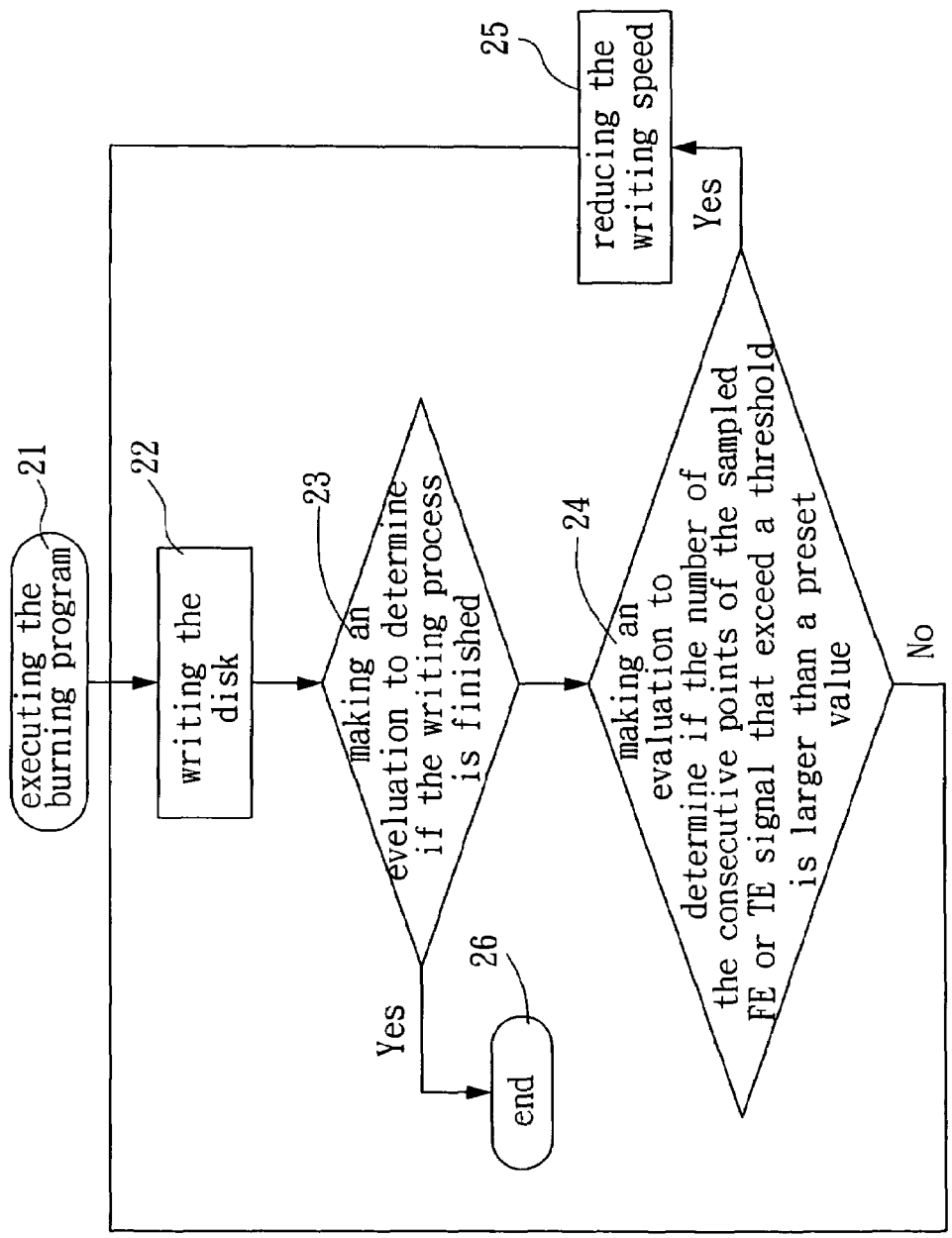
FIG. 5 is a flow chart of the smart burn method of the present invention.

Please refer to FIG. 5, which is the flow chart of the smart burn method of the present invention. The sampling and monitoring are processed by the digital signal processor (DSP). When the FE or TE signal exceeds a certain threshold during a writing process, the DSP will send out a corresponding interrupt flag to the burner to reduce the writing speed since the writing condition is poor. The procedure includes the following steps:

Step 21: executing the burning program;

Step 22: writing the disk;

Step 23: making an evaluation to determine if the writing process is finished; if yes, proceed to step 26; if not, proceed to step 24;

Step 24: making an evaluation to determine if the number of the consecutive points of the sampled FE or TE signal that exceed a threshold is larger than a preset value; if yes, proceed to step 25; if no, proceed to step 22, wherein the "signal width and height" and the "sharp signal" described in FIGS. 1, 2 and 3 are used as the standard to obtain the testing result;

Step 25: reducing the writing speed and restarting the writing process, and then proceeding back to step 24, if the signal is still poor, reducing the writing speed and then proceeding back to step 22; and Step 26: end.

Figure 6:
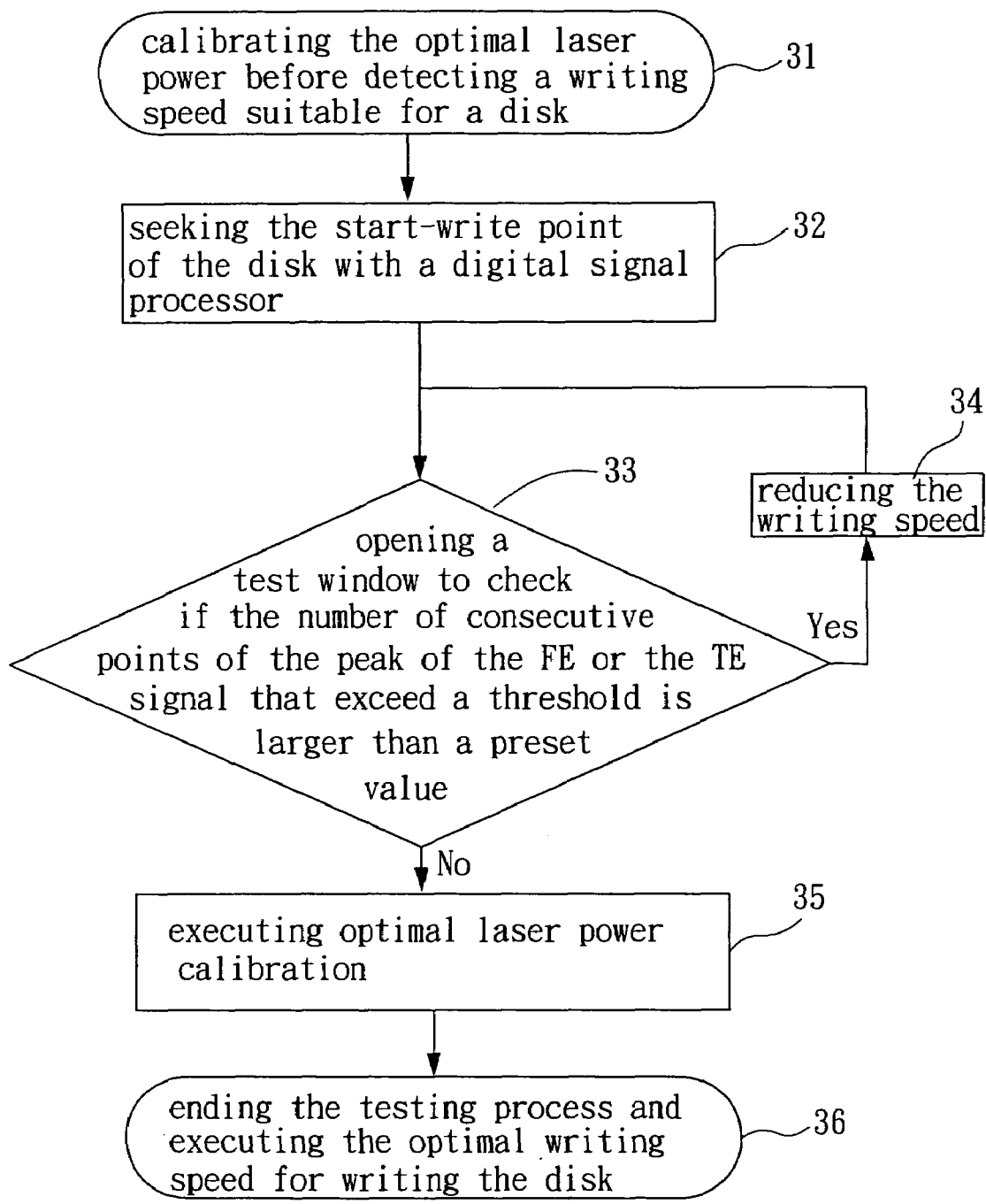
FIG. 6 is a flow chart of pre-writing quality test procedure for disks according to the present invention.

Please refer to FIG. 6, which is the flow chart of pre-writing quality test procedure for disks according to the present invention. The qualities of the disks on the market vary since different manufacturing procedures are being used. As a consequence, the stabilities in the writing process vary as well. If the quality is not examined in the beginning stage of the writing process, automatic speed reduction will be executed to re-link in the process of writing and more time will be consumed. To improve the above-mentioned disadvantages, the procedure of the present embodiment detects the optimal writing speed in the beginning stage which eliminates the re-linking process and hence shortens the processing time.

To test the quality of the disk before writing, the optical pick-up head seeks to the start-write point at the inner most layer of the disk. A digital signal processor is then being utilized to open a 50 ms window to test if the disk is suitable for writing with the maximum speed. If not, the speed will be reduced and the disk will be tested again until a proper speed is reached. With this proper speed, the optical pick-up head can be calibrated and the writing process can begin. The procedure of the flow chart includes:

Step 31: calibrating the optimal laser power after detecting a writing speed suitable for a disk;

Step 32: seeking the start-write point of the disk with a digital signal processor;

Step 33: opening a test window to check if the number of consecutive points of the peak of the FE or the TE signal that exceed a threshold is larger than a preset value, if yes, proceed to step 34; if no, proceed to step 35;

Step 34: reducing the writing speed and then proceeding to step 33;

Step 35: executing optimal laser power calibration; and

Step 36: ending the testing process and executing the optimal writing speed for writing the disk.

In conclusion, the features and the preferred embodiments of the present invention are described in detail. The objects and the effeteness of the present invention have both advancement and industrial merits while which is not found on the current market. Therefore, the present invention meets the requirement stated by the patent law.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A smart burn method for an optical drive, comprising steps of:

(A1) executing a burning program;
(A2) executing a writing process by said optical drive;
(A3) making an evaluation to determine if the writing process is completed;
(A4) making an evaluation, based on the result of step (A3), to determine if the number of the consecutive points of a sampled focus error (FE) signal that exceed a threshold is larger than a preset value;
(A5) reducing the writing speed of said optical drive based on the result of step (A4); and
(A6) ending said writing process based on other result in step (A3).

2. The method of claim 1, wherein the frequency used for sampling said focus error signal (FE) is 22.05 KHz.

3. The method of claim 1, wherein a frequency comparison mechanism and an accumulation mechanism are used as the testing device in step (A4).

4. The method of claim 1, wherein the writing speed is reduced while the number of the consecutive points of the sampled FE signal exceeding a threshold is larger than a preset value.

5. The method of claim 1, wherein if the result of step (A3) is yes, then proceed to step (A6); if no, then proceed to step (A4).

6. The method of claim 1, wherein if the result of step (A4) is yes, then proceed to step (A5); if no, then return to step (A2).

7. The method of claim 1, wherein step (A2) is proceeded after executing step (A5).

8. A smart burn method for an optical drive, comprising steps of:
(B1) executing a burning program;
(B2) executing a writing process by said optical drive;
(B3) making an evaluation to determine if the writing process is completed;
(B4) making an evaluation, based on the result of step (B3). to determine if the number of the consecutive points of a sampled tracking error (TE) signal that exceed a threshold is larger than a preset value;
(B5) reducing the writing speed of said optical drive based on the result of step (B4); and
(B6) ending said writing process based on other result in step (B3).

9. The method of claim 8, wherein the frequency used for sampling said tracking error signal (TE) is 22.05 KHz.

10. The method of claim 8, wherein a frequency comparison mechanism and an accumulation mechanism are used as the testing device in step (B4).

11. The method of claim 8, wherein the writing speed is reduced while the number of the consecutive points of the sampled TE signal exceeding a threshold is larger than a preset value.

12. The method of claim 8, wherein if the result of step (B3) is yes, then proceed to step (B6); if no, then proceed to step (B4).

13. The method of claim 8, wherein if the result of step (B4) is yes, then proceed to step (B5); if no, then return to step (B2).

14. The method of claim 8, wherein step (B2) is proceeded after executing step (B5).

15. A smart burn method for an optical drive, comprising steps of:
(C1) executing a burning program;
(C2) executing a writing process by said optical drive;
(C3) making an evaluation to determine if the writing process is completed;
(C4) making an evaluation, based on the result of step (C3). to determine if the number of the consecutive points of a sampled tracking error (TE) signal andFE focus error (FE) signal that exceed a threshold is larger than a preset value;
(C5) reducing the writing speed of said optical drive based on the result of step (C4); and
(C6) ending said writing process based on other result on step (03).

16. The method of claim 15, wherein the frequency used for sampling said focus error signal (FE) is 22.05 KHz, and the frequency used for sampling said tracking error signal (TE) is 22.05 KHz.

17. The method of claim 15, wherein a frequency comparison mechanism and an accumulation mechanism are used as the testing device in step (C4).

18. The method of claim 15, wherein the writing speed is reduced while the number of the consecutive points of the sampled TE signal exceeding a threshold is larger than a preset value and the number of the consecutive points of the sampled FE signal exceeding a threshold is larger than a preset value.

19. The method of claim 15, wherein if the result of step (C3) is yes, then proceed to step (C6); if no, then proceed to step (C4).

20. The method of claim 15, wherein if the result of step (C4)is yes, then proceed to step (C5); if no, then return to step (C2).

21. The method of claim 15, wherein step (C2) is proceeded after executing step (C5).

22. An automatic disk pre-writing quality testing method of optical drive, comprising the steps of:
(D1) calibrating the laser power to be optimum before detecting a writing speed suitable for a disk;
(D2) seeking the start-write point of the disk with a digital signal processor;
(D3) opening a test window to check if the number of consecutive points of the peak of a tracking/focusing error (FE/TE) signal that exceed a threshold is larger than a preset value;
(D4) reducing the writing speed based on the result of step (D3);
(D5) executing optimal laser power calibration based on other result of step (D3); and
(D6) ending the testing and executing an optimal writing speed following step (D5).

23. The method of claim 22, wherein in step (D3) if the result is yes, then proceed to step (D4); if no, then proceed to step (D5).

24. The method of claim 22, wherein step (D3) is proceeded after executing step (D4).

* * * * *